Dec. 30, 1958 H. E. ZAHN 2,866,841
ELECTRODE SEPARATOR
Filed May 2, 1956
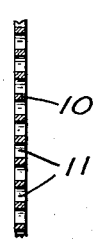
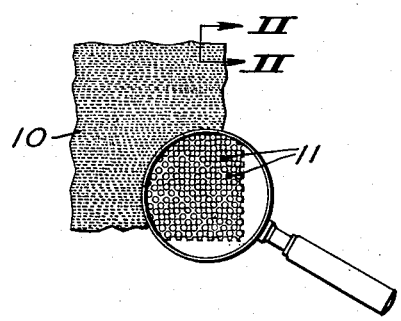
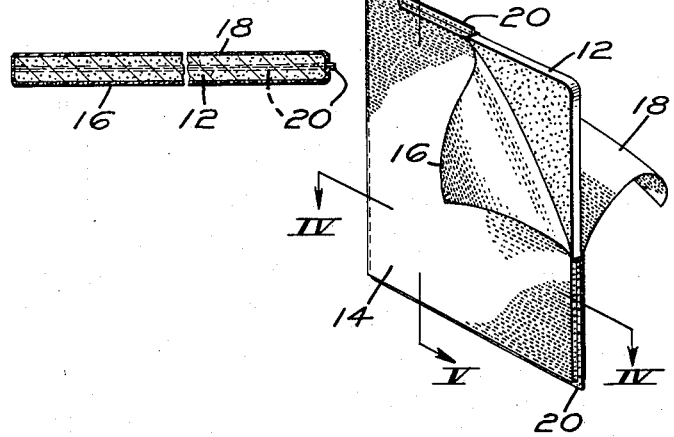
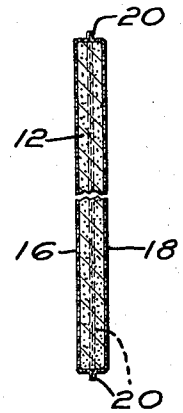
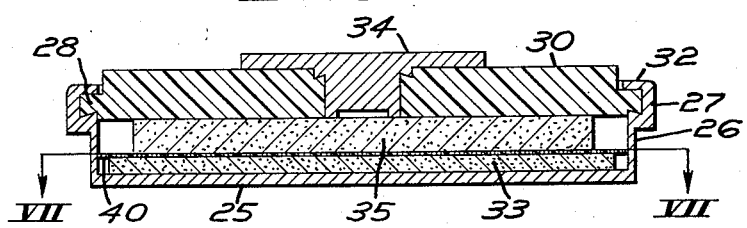
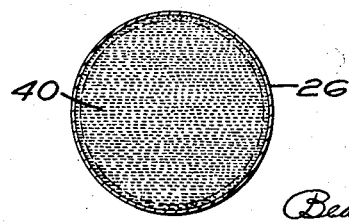
INVENTOR:
HAROLD E. ZAHN
BY
Beau, Brooks, Buckley & Beau,
ATTORNEYS.

United States Patent Office 2,866,841
Patented Dec. 30, 1958

2,866,841

ELECTRODE SEPARATOR

Harold E. Zahn, Buffalo, N. Y., assignor to Gould-National Batteries, Inc., St. Paul, Minn.

Application May 2, 1956, Serial No. 582,213

5 Claims. (Cl. 136—147)

This invention relates to alkaline electrolytic cells, and more particularly to improvements in separator constructions disposed between electrodes of opposite polarity in alkaline electrolyte type cells.

An object of the invention is to provide in a cell as aforesaid a separator of improved construction both with respect to the chemical nature of the material employed in the fabrication, and in the physical construction thereof.

Another object of the invention is to provide a separator as aforesaid having optimum ion migration, electrolyte circulation, and gas migration characteristics.

Another object of the invention is to provide a separator as aforesaid which is of improved chemical inertness and mechanical stiffness and rigidity, and which is dimensionally stable under both assembly and operative conditions encountered in alkaline electrolyte type cells.

Other objects and advantages of the invention will appear from the specification hereinafter.

The invention contemplates, broadly, provision of a separator fabrication formed of web or film or sheet material having certain chemical makeup and structural and functional characteristics; the material being selected from the class of materials including certain polyamides included in that class of chemical compounds comprising the synthetic polymeric amides having a protein-like chemical structure, commercially designated as the polymerized condensation product of adipic acid and hexamethylenediamine. This product is commercially available and known to the trade as "nylon" and for convenience in reference thereto hereinafter the material will be called nylon.

The film is perforated and fabricated and mounted in the cell assembly in improved manner as will be explained hereinafter. It has been determined that nylon inherently possesses certain highly desirable characteristics in relation to alkaline electrolytic cell use; such as inertness to the electrolyte and to the metal customarily employed in such cells, as well as to the active material thereof and to the gases generated within such cells. For example, materials which might suggest themselves as being obvious alternatives for the purpose of the invention, yet which do not function in comparable manner include the acetates, rayon, acrylics, and rubber compositions. When comparably tested for the purposes of the invention, it was found that the acetates tend in time to saponify; the rayons swell and lose strength; the acrylics are only moderately resistant to alkali solutions; and rubber compositions decompose in the alkaline environment. Another advantage attendant the use of nylon is that it lends itself particularly to fabrication methods such as seam heat-sealing or bonding, whereby separator devices of the present invention may be manufactured with improved facility, as will be explained more thoroughly hereinafter.

Also, it has been determined that finely perforated nylon sheets may be constructed to possess optimum electrical insulative as well as porosity characteristics for battery separator purposes. Hence, optimum ion migration and electrolyte circulation and gas migration characteristics may be obtained, while at the same time it functions efficiently to prevent shorting between the opposed polarity plates at opposite sides of the separator. Typical adaptations of the nylon sheet material of the present invention to battery separator use are illustrated in the accompanying drawing wherein:

Fig. 1 is a fragmentary elevational view with a portion thereof shown in a magnified scale, of a section of nylon sheet material as used in the case of the present invention;

Fig. 2 is a fragmentary section on enlarged scale taken along line II—II of Fig. 1;

Fig. 3 is a perspective view of a storage battery plate assembly embodying a separator device of the present invention;

Fig. 4 is a fragmentary section, on an enlarged scale, taken along line IV—IV of Fig. 3;

Fig. 5 is a fragmentary section, on an enlarged scale, taken along line V—V of Fig. 3;

Fig. 6 is a diametric sectional view through a "button cell" type battery incorporating a separator device of the present invention; and Fig. 7 is a sectional view, on a reduced scale, taken along line VII—VII of Fig. 6.

As shown in the drawing at Fig. 1, the nylon sheeting stock material 10 used for separator fabrication in the case of the present invention is finely perforated as indicated at 11. The sheet stock may of course be selected of any preferred thickness, for example of the order of .002" to .025" thick. The sheeting may be perforated by any preferred method, such as mechanically or chemically, as is well known in the art; the size and relative spacing of the perforations being regulated so as to obtain the desired porosity characteristics. For example, the openings may be provided of the order of from .005 inch diameter to .06 inch diameter. Generally speaking, the thinner the sheet the smaller the hole size will be needed. It is a particular feature of nylon that it may be finely perforated by either mechanical or chemical processes, and then hot-ironed or pressed so as to render the pore sizes still smaller, and to precisely the preferred size and degree of porosity.

The separator sheeting material of the present invention possesses several characteristics which greatly facilitate battery manufacturing processes. For example, as shown in Figs. 3, 4, 5, a battery plate as indicated at 12 may be readily enclosed within an envelope 14 formed of the nylon sheeting referred to hereinabove, by simply placing a pair of slightly oversized sheets 16, 18 against opposite sides of the plate and then bending their edges inwardly into lapped relation as indicated at 20. The lapped joint may then be easily solvent-sealed or heat-sealed by simply running a heated tool therealong; the characteristics of the nylon material being such as to thereupon provide a firmly sealed marginal edge around the plate assembly.

More specifically, as illustrated in Fig. 4, the insulative envelope 14 of Fig. 3 may be readily fabricated from a single double-size sheet of perforated nylon sheeting which is first centrally folded around the bottom or other edge of the plate 12 and then lapped against the opposite sides of the plate as shown in Fig. 3, whereupon the extending edges of the sheeting along the other three edges of the plate may be lap-sealed together as explained hereinabove. In either case, it will be appreciated that the plate 12 may be thus enclosed with utmost facility within a snug fitting envelope of nylon having the insulative and porosity characteristics referred to hereinabove. The sheeting stock referred to is adapted to be die-cut or sheared with utmost facility, without formation of raveling threads or the like such as constitute a problem in connection with the use of certain other insulative materials.

Also, as explained hereinabove the nylon material of the sheeting is inherently inert to the gases generated during the battery operation and to the battery electrolyte and to the metal and active material of the battery.

Figs. 6 and 7, illustrate by way of another example, embodiment of the invention in a button cell type battery wherein the battery case is designated 25. Whereas, only a sectional view of the battery is illustrated herein, it will be understood that the casing 25 is circular in plan view and includes a cylindrical side wall portion 26 terminating in a flange 27 gripping the marginal edge 28 of the cell cover disk 30. For this purpose, the flange 28 may be spun or beaded inwardly as indicated at 32 to complete the grip upon the cover 30 and to hold it in firmly assembled relation. In this example, the case 25 comprises the positive terminal of the cell. The positive plate of the cell is indicated at 33.

The cover 30 may be formed of any suitable insulative material, such as one of the synthetic plastics or other electrolyte-inert insulative materials, and is centrally bored to accommodate the central post portion of the negative terminal member as indicated at 34. At its inner end, the terminal 34 electrically connects to the negative plate of the cell which is indicated at 35. In this instance the separator device is illustrated at 40 to comprise a disk shaped sheet of perforated nylon as explained hereinabove. The nylon stock is readily die-cut into disk shaped form and then slip-fitted downwardly into the casing 26 subsequent to assembly of the positive plate 33 therein. To complete the battery assembly, the negative plate 35 is then placed in position on top of the separator 40, and the cover 30 is then set in position and locked therein by turning over the flange edge 32 as explained hereinabove. Sufficient electrolyte for cell operation is made available by simply saturating the positive and negative electrodes as well as the separator sheet with electrolyte solution just prior to their final assembly in the cell. The separator material does not absorb the electrolyte, but this is unnecessary because it absorbs sufficient electrolyte in the separator perforations and holds it by surface tension, to provide a continuous liquid bridge between the electrodes of opposite polarity.

Whereas only a few forms of the invention have been illustrated and described in detail hereinabove, it will be understood that various changes may be made therein without departing from the spirit of the invention or the scope of the appended claims.

I claim:
1. In an alkaline electrolytic cell containing electrodes of opposite polarity, a separator disposed between said electrodes and comprising a perforated cast film of nylon material having a thickness of no more than 0.025 inch.

2. In an electrolytic cell containing electrodes of opposite polarity, a wrapper substantially enclosing one of the electrodes of said cell, said wrapper being formed of perforated cast nylon film of a thickness not more than 0.025 inch, the meeting edges of said wrapper material being bonded together.

3. The method of manufacturing and mounting an electrode separator, comprising perforating a cast nylon film, then heat-pressing it to reduce the perforations to the desired size, and then wrapping it about the electrode and bonding the extending meeting edges of said film together.

4. The method of manufacturing and mounting an electrode separator of envelope form, comprising the steps of perforating a cast nylon film and then wrapping it about the electrode and heat-bonding together the meeting edges of said film where they overlap at the edges of the electrode.

5. In an alkaline electrolytic cell containing electrodes of opposite polarity, an insulating separator disposed between said electrodes, said separator comprising a sheet of nylon cast film of a thickness between 0.002 and 0.025 inch and having perforations therethrough measuring between 0.005 and 0.06 inch in diameter.

References Cited in the file of this patent

UNITED STATES PATENTS

| | | |
|---|---|---|
| 2,570,677 | Honey et al. | Oct. 9, 1951 |
| 2,571,927 | Neumann et al. | Oct. 16, 1951 |
| 2,591,755 | Wilson et al. | Apr. 8, 1952 |
| 2,647,157 | Booth | July 28, 1953 |
| 2,701,271 | Mautner et al. | Feb. 1, 1955 |